United States Patent [19]
Bodor et al.

[11] Patent Number: 5,391,864
[45] Date of Patent: Feb. 21, 1995

[54] PATTERNED SUSCEPTOR FOR MICROWAVABLE COOKIE DOUGH

[75] Inventors: Janos Bodor, Rijswijk, Netherlands; Girish Desai, Ellicott City, Md.; Morteza Nematollahi, Tehran, Islamic Rep. of Iran; Ravinder Reddy, Columbia, Md.

[73] Assignee: Van den Bergh Foods Company, Division of Conopco, Inc., Lisle, Ill.

[21] Appl. No.: 990,474

[22] Filed: Dec. 14, 1992

Related U.S. Application Data

[63] Continuation-in-part of Ser. No. 731,838, Jul. 16, 1991, abandoned.

[51] Int. Cl.6 .................................................. H05B 6/80
[52] U.S. Cl. ................................... 219/730; 219/759; 426/107; 426/234; 426/243; 99/DIG. 14
[58] Field of Search ............... 219/10.55 E, 10.55 F, 219/10.55 M, 730, 759; 426/107, 109, 111, 112, 113, 114, 234, 241, 243; 99/DIG. 14

[56] References Cited

U.S. PATENT DOCUMENTS

| | | | |
|---|---|---|---|
| 4,676,857 | 6/1987 | Scharr et al. | 426/107 |
| 4,882,463 | 11/1989 | Kyougoku et al. | 219/10.55 E |
| 4,883,936 | 11/1989 | Maynard et al. | 219/10.55 E |
| 4,896,009 | 1/1990 | Pawlowski | 219/10.55 E |
| 4,904,836 | 2/1990 | Turpin et al. | 219/10.55 E |
| 4,970,360 | 11/1990 | Pesheck et al. | 219/10.55 E |
| 5,038,009 | 8/1991 | Babbitt | 219/10.55 E |
| 5,079,397 | 1/1992 | Keefer | 219/10.55 F |
| 5,171,594 | 12/1992 | Babbitt | 219/10.55 E |

FOREIGN PATENT DOCUMENTS

88/05249 7/1988 WIPO.
90/12477 10/1990 WIPO.

Primary Examiner—Philip H. Leung
Attorney, Agent, or Firm—A. Kate Huffman

[57] ABSTRACT

A novel microwavable susceptor used for cooking expandable dough in a microwave oven is disclosed. Specifically, the susceptor comprises an inner region and an outer region, the inner region having a pattern of metalized and/or non-metalized portions wherein the intensity of the inner region is about from about 25% to about 75% and the outer region has an intensity arbitrarily set at about 100%. A cookie dough composition having desirable spreadable characteristics useful for baking in a microwave is also disclosed. The susceptor is reusable.

21 Claims, 7 Drawing Sheets

☐ INTENSITY 0%
▩ INTENSITY 100%

FIG.1

☐ INTENSITY 0%
▨ INTENSITY 100%

PATTERNED SUSCEPTOR FOR MICROWAVABLE COOKIE DOUGH

This application is a continuation-in-part of U.S. Ser. No. 07/731,838, filed Jul. 16, 1991, now abandoned.

FIELD OF THE INVENTION

This invention relates to a patterned susceptor particularly useful for cooking dough in a microwave oven.

BACKGROUND OF THE INVENTION

Susceptors, sometimes referred to as heaters, convert microwave energy into thermal energy and are used to intensify heat at a food surface of an item to be cooked in a microwave. Such susceptors are particularly useful for browning or crisping a food's exterior while providing a hot moist interior. This property alleviates the problem of sogginess and enhances mouth feel for many microwave foods, such as cookies, egg rolls, etc.

Conventional susceptors are made by vacuum depositing a thin metal layer onto a substrate. Although a wide variety of substrates are available, the widely used disposable susceptors comprise a thin metal film deposited on a dimensionally stable dielectric substrate such as polyester which may be bound to a paper support for stability as described in U.S. Pat. No. 4,970,360 and 4,904,836.

Microwave heating of foods with susceptors can be problematic because the hot susceptor which is in contact with food can causing burning in spots. This problem has been addressed in the art by patterning the metalized film of the susceptor to predetermine its heat intensity. Patterns, such as checkerboards and concentric circles, can be produced by varying the thickness of the metal film layer as described in U.S. Pat. No. 4,904,836 issued to Turpin.

Many of the patterned susceptors, however, produce undesirable organoleptic properties, particularly in expandable dough products, such as cookies, baked in the microwave oven. Burnt and undercooked surface areas result from patterned susceptors known in the art because expansion and spreading of some dough occurs during microwaving to change the dough's geometry. Thus the surface area of the dough increases non-linearly with time exposing the spreading dough to a surface of the susceptor upon which it bakes. At the same time a portion of the dough remains exposed to the susceptor surface throughout the baking process causing charring in that portion.

It is thus an object of the present invention to provide novel patterned susceptors which improve the organoleptic properties of expandable dough within the scope of the invention.

It is further an object of the invention to provide a reusable susceptor tray which is more environmentally friendly than the current disposable susceptors. The reusable susceptor may also double as a closure for a container in which the dough is packaged.

Another object of the invention is to provide a cookie dough composition having uniform spreading characteristics in the short baking time of a microwave oven.

SUMMARY OF THE INVENTION

The present invention involves a product which is used for baking an expandable dough product in a microwave oven. The product comprises a susceptor used to absorb a portion of a microwave field energy and convert the absorbed portion to thermal heat. The susceptor comprises a film layer of thinly deposited metal having an inner region and an outer region. The inner region has a radius of from about 0.7 cm. to about 5 cm and the deposited metal has an intensity ranging from about 25 to about 75% of the intensity of the outer region. The intensity of the inner region is constant or preferably increases in a continuous manner from a center point of the inner region to a circumference point of the inner region. The outer region substantially surrounds the inner region and its deposited metal has an intensity arbitrarily set at of about 100%.

The product further comprises a support means attached to one surface of the susceptor means used for stabilizing and supporting the susceptor and the microwavable dough to be cooked by microwave radiation on the susceptor means.

In a preferred embodiment, the inner region of the susceptor means is divided into a plurality of sectors, both metalized and non-metalized in a predetermined pattern. The total number of sectors is preferably from 8 to 60 and most preferably from 50 to 60, with substantially equal numbers of metalized sectors to non-metalized sectors. The intensity of the inner region is preferably 40 to 60% of the intensity of the outer region of the susceptor, and most preferably about 50%.

In another preferred embodiment, the inner region of the susceptor is pattered into a plurality of concentric circles substantially encompassing each other and increasing continuously in intensity from about 25 to about 75% of the intensity of the outer region of the susceptor. The outer region is a circular region substantially encompassing the inner region and having about 100% intensity.

Another aspect of the invention is a novel cookie dough containing ingredients which produce desirable spreading characteristics in a short baking time, i.e., less than about 2 minutes in a microwave oven. A browning agent is also included in the dough to enhance the browning produced by the susceptor.

In a most preferred embodiment, the susceptor means comprises a baking sheet placed between the susceptor's surface and the dough positioned on it. The baking sheet retards the deterioration of the film layer upon repeated exposure to microwave energy fields and provides a reusable susceptor means for repeated baking.

DETAILED DESCRIPTION OF PREFERRED EMBODIMENTS

The present invention pertains to a product comprising a susceptor means and support means used for microwaving expandable dough such as cookie, cake or bread.

The term "expandable dough" used herein means a dough containing both a gluten source and a starch source having a surface area which initially is in contact with a surface of the suspector means and which increases in at least one direction, preferably two directions upon heating in a microwave oven.

The susceptor means has a thinly deposited metal layer forming a film onto a substrate according to any conventional means known in the art. The film layer is divided into an inner region having an intensity of 25 to 75% of an total intensity of the film layer of an outer region which substantially encompasses the inner region. The outer region has an intensity of about 100%. In a preferred embodiment the intensity of the inner region is 40 to 60%.

The regions are formed by patterning the deposited metal of the layer to produce the desired intensity. An important aspect of the invention is that the intensity of the inner region is constant or increases from a center point of the inner region to a point on the region's circumference. Various patterns of metal within the inner region produce the desired intensity.

Intensity means the amount of thermal heat that can be conducted from the metalized film layer of a susceptor to a food item which comes in contact with a film layer. Intensity is determined by several factors including the thickness of the metalized film of the susceptor, the types of metals used either singly, or in combination, to deposit the film layer and the shape and distribution of the metal particles deposited upon the substrate of the susceptor.

The present invention pertains to a susceptor made by conventional means having a deposited film layer with a thickness of about 300 to about 500 angstroms and having resistivities of the metals in a range from about 10 to about 500 ohms per square. The patterns of the subject invention may be produced by any means known in the art such as varying the thickness of the film layer during deposition or directing deposition to selected portions of the substrate.

Preferably, the intensity of the inner region increases continuously from a center point to a circumference point of the inner region in a range of about 25 to about 75% intensity of the intensity of the outer region, and preferably is from about 40 to about 60% intensity. The intensity of the deposited metal of the outer region is arbitrarily set at about 100%. Various patterns within the scope of the invention are used to produce the constant or preferably continuously increasing intensities of the inner region necessary to bake the expandable microwavable dough.

Expandable dough, such as cookie dough, both expands and spreads during baking. Specifically, when a serving of microwavable cookie dough is placed on a susceptor and baked in the microwave oven, a surface area of the dough increases non-linearly with time. Thus as the geometry of the dough changes with time, some portions of the dough are exposed to different portions of the susceptor while another portion of the dough is continuously exposed to the same portion of the susceptor. This uneven exposure causes charring or undercooking.

The invention addresses this problem of baking expandable dough in a microwave oven to provide an evenly browned product with desirable organoleptic properties.

Figure 1:
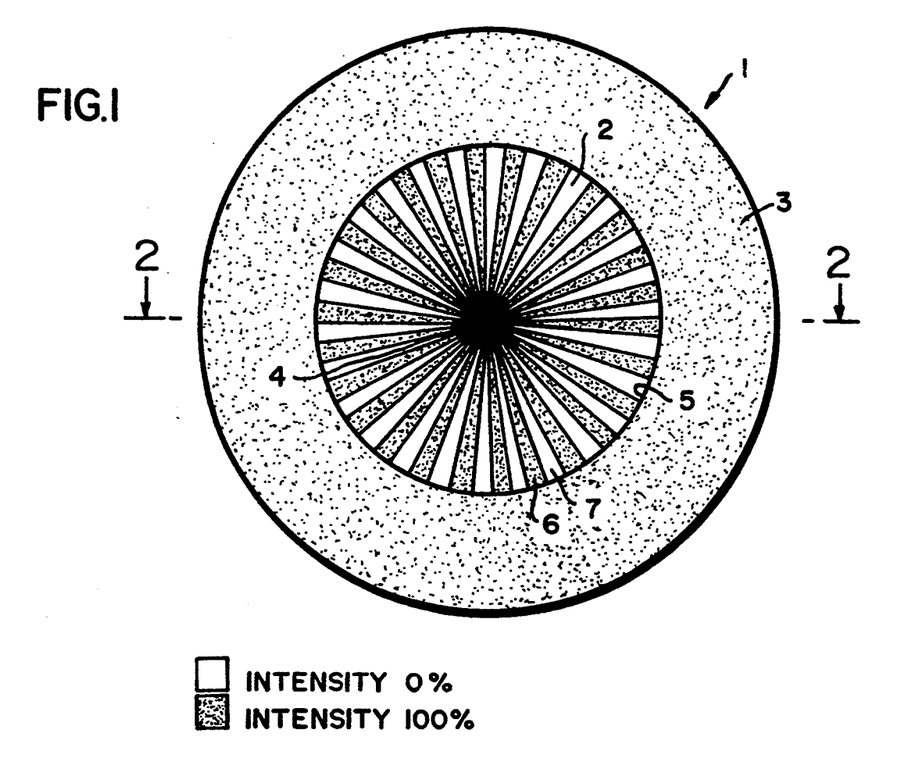
FIG. 1 is a top view of a preferred embodiment of the susceptor tray having a wheel spoke pattern of non-metalized and metalized sectors.

As shown in FIG. 1, a susceptor 1 has an inner region 2 and an outer region 3. The inner region has a radius of not more than about 5 cm and preferably has a radius in a range of about 0.7 cm to about 5 cm.

The intensity I of the inner region 2 is constant and about 50% of the intensity of the outer region which is arbitrarily set at about 100%.

The deposited metal film of the inner region 2 is divided into sectors of both metalized sectors 6 and non-metalized sectors 7. Each sector is preferably radially symmetrical to another sector within the inner region 2.

The total number of both metalized and non-metalized sectors is preferably in a range of about 8 to about 60 and the ratio of metalized sectors 6 to non-metalized sector 7 is in a range of 0.25 to 3.0. In a preferred embodiment, the total number of sectors is about 40 to about 60 and in a most preferred embodiment about 50 sectors, with an equal number of metalized to non-metalized sectors. The intensity I of the inner region is about 25 to about 75% of the intensity of the outer region, and is preferably from about 40 to about 60%. The outer region 3 has an intensity of about 100%.

In a preferred embodiment, the shape and the area of the inner region 2 is substantially the same as the shape and surface area of a portion of expandable dough to be baked on the susceptor. In an especially preferred embodiment, the expandable dough is cookie. An average cookie dough serving is about 40 gms. A preferred shape is spherical for both the inner region and the cookie dough serving. It may be appreciated, however, that any shape of the inner region and the cookie dough portion may be utilized within the scope of the invention.

Figure 2:
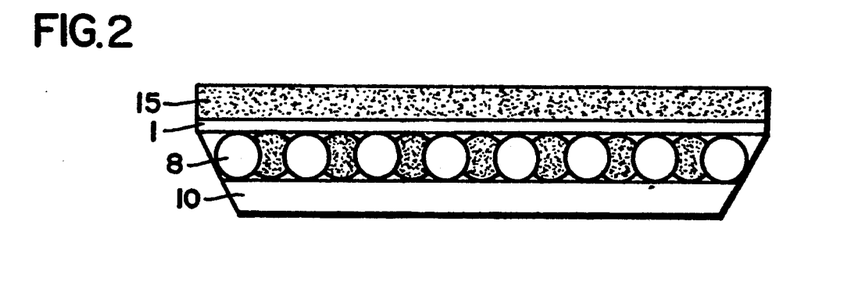
FIG. 2 is a cross-sectional view through line A—A of FIG. 1.

As illustrated in cross-section in FIG. 2, the susceptor 1 may be adhered or applied to a support such as corrugated paper board, paper, polyester, etc. as known in the art. In a preferred embodiment the support is a corrugated paper board layer 8.

In a most preferred embodiment, the susceptor 1 and paper board 8 are further supported by a tray 10. The tray is preferably of a non-flexible plastic such as polypropylene and shaped to form a closure means for a container in which the microwave dough is packaged. As illustrated in FIG. 2, the tray 10 is in the form of a lid as a closure.

The susceptor tray is provided with a baking sheet 15 on the surface of the susceptor 1 on which the dough is placed for microwaving. Susceptors have conventionally been singly used and then disposed because the polyester substrates, for example, melt at temperatures of 200° to 250°. Metalized portions of such susceptors breakdown upon repeated exposure to microwave energy fields. Moreover, some susceptor materials which may come in contact with food surfaces may not be completed inert.

Therefore, in a most preferred embodiment, a baking sheet 15 is applied to the surface of the susceptor facing the food item to be microwaved to act as a barrier between the susceptor metalized film and the food item. Such a baking sheet 15 should be made of a material that can withstand up to about 500° F., have a thickness thin enough so that heat conductivity is not prevented, be impermeable to liquids, be transparent to microwave radiation and be as inert as possible. Suitable materials for the baking sheet 15 include paper, glass fibers, cotton and woven glass fibers. Such materials are preferably coated with a material such as polytetrafluoro ethylene. A most preferred material is made of woven glass fibers coated with polytetrafluoro ethylene or Teflon ® known as Chemglass and owned by Chemical Fabrics Corporation of Merrimack, N.H.

It is understood that the baking sheet 15 may be made of any suitable material discussed above or known in the art and may be applied to the food surface of any disposable susceptor to prevent its deterioration and prolong the numbers of uses per each susceptor.

The baking sheet 15 on the susceptor tray 1 prolongs the number of uses of the tray to about 12 to about 15 times. It may thus be appreciated that 12 to 15 single serving portions of a food item may be microwaved using a susceptor including a baking sheet 15.

Figure 3:
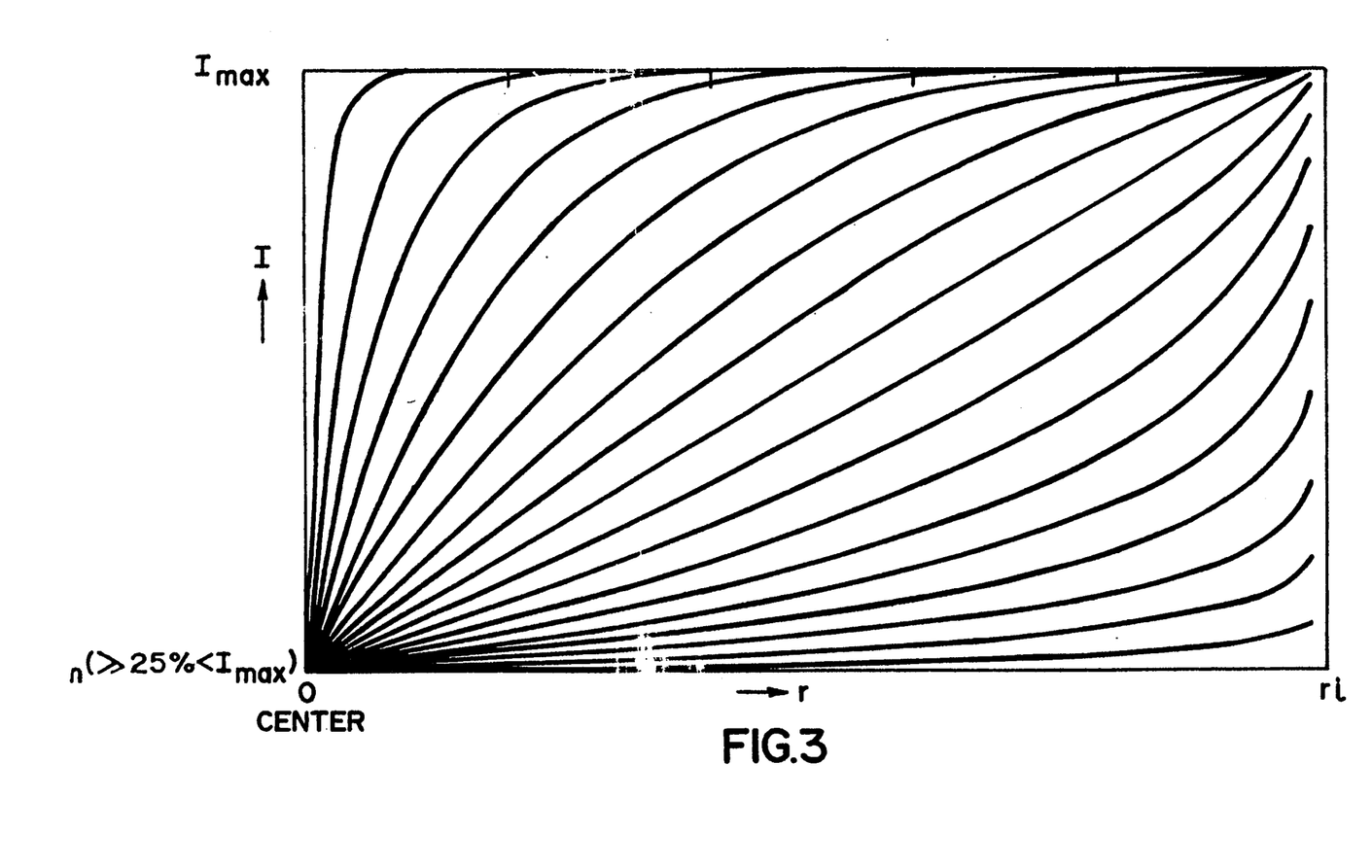
FIG. 3 is a graphic illustration of the intensities of various susceptors within the scope of the invention in a continuous linear, non-linear and step-wise manner.

FIG. 3 graphically illustrates the continuing intensity of the inner region 2 of the novel susceptor going from its center point 4 to its circumference point 5. As illustrated, the intensity increases from I min (0<I min<75%) I max which is less than or equal to about 100% along the vertical axis. The horizontal axis extends from the center point 4 to the radius of the inner region. The radius is illustrated as ri. The radius of the outer region 3 would be ro. As shown in FIG. 3, as the radius of the inner region 2 increases from 0 to Ri centimeters, the intensity I of the inner region increases from I min to I max. This increase may be accomplished in a linear manner, non-linear manner and stepwise manner by a predetermined pattern selection of the inner region 2.

Figure 4:
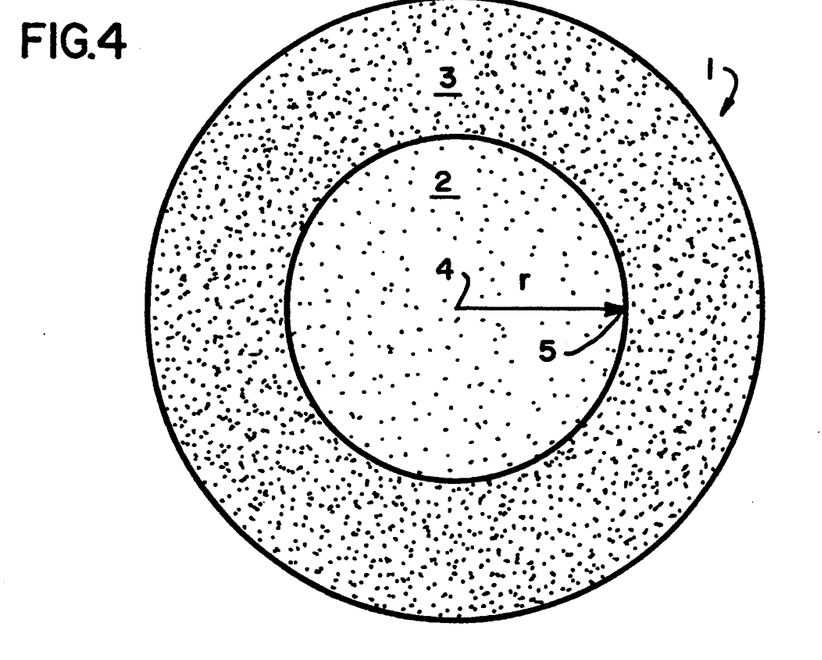
FIG. 4 is a top plan view of a second preferred embodiment of the susceptor tray illustrating concentric circles of continuously intensifying deposited metal.

FIG. 4 illustrates a second embodiment of the invention. Specifically, the inner region 2 extends from the center point 4 to a circumference point 5 of the inner region 2. The inner region 2 has an overall intensity ranging from 25 to 75% along a radius r. The outer region 3 is illustrated as substantially surrounding the inner region 2 and having an intensity of about 100%.

Figure 5:
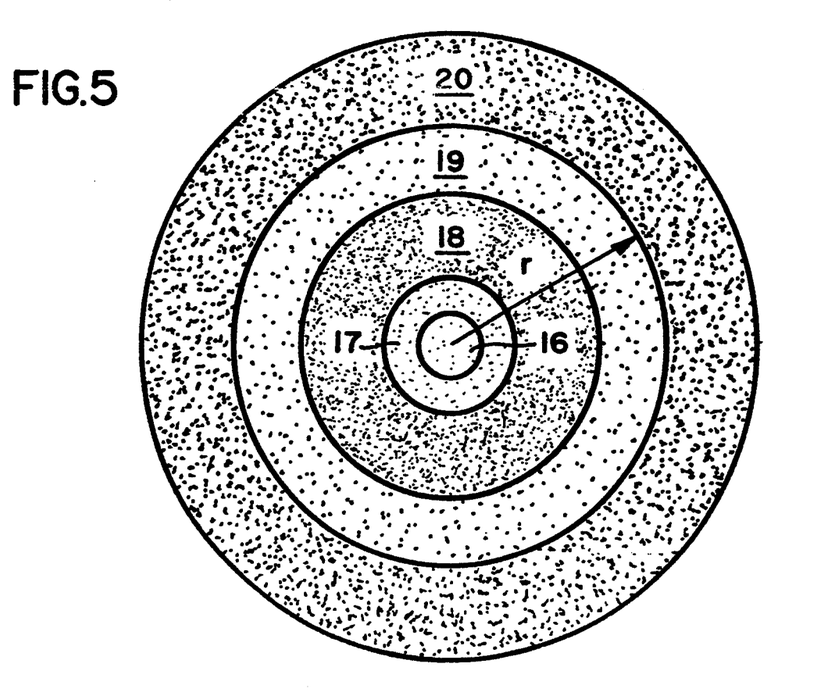
FIG. 5 is a top plan view of a third preferred embodiment of the susceptor tray.

FIG. 5 illustrates a third embodiment of the invention. Specifically, the inner region 2 is divided into a plurality of concentric rings in a direction from the center point 4 to the outer circumference point 5 of the inner region 2. Each increasingly larger concentric ring has a continuously increasing intensity in a direction from the center point 4 to the circumference point 5. For example, ring area 16 has an intensity of $I_1$ less than ring area 17 having an intensity of $I_2$. Ring area 17 has an intensity of $I_2$ which is less than the intensity $I_3$ of ring area 18 and ring area 18 has an intensity $I_3$ which is less than the intensity of ring area 19. The outer area 20 has an intensity $I_5$ of about 100%. The inner region 2 may be divided into a total number of concentric rings of from 2 to about 20 and preferably has a radius r of from about 0.7 cm to about 5 cm. The overall intensity of the inner region is 25-75% of that of the outer region.

It may further be appreciated that each preferred embodiment may be arranged with one or more similar susceptors or different susceptors within the scope of the invention to form a multiple serving susceptor for microwaving two or more dough portions at a time.

Microwavable Cookie Dough

Conventional expandable doughs which are unbaked or unproofed were observed to have undesirable spreading characteristics when cooked in a microwave oven.

The novel cookie dough composition of the subject application overcomes the undesirable characteristics of prior art cookie doughs so that the microwaved dough is substantially brown on its surface while remaining moist with good organoleptic properties. Additionally, drying out and other undesirable characteristics of prior art microwaved cookies are overcome. The cookie dough composition in combination with the susceptor provides a desirable browning or crisping property to the cookie while avoiding undue spreading, charring or undercooked areas.

Specifically, the cookie dough composition of the invention contains about 20 to about 34% flour, about 2 to about 16% of a browning agent, about 10 to about 40% sugar, about 5 to about 22% of a humectant, about 10 to about 30% shortening, preferably with emulsifiers, about 2 to about 10% of an egg component, about 0.2 to about 1% of a leavening agent, about 0.2 to about 1% salt, about 0.2 to about 1% hydrocolloids, about 1 to about 5% non-fat dry milk, and about 2 to about 12% added fiber. Optional ingredients include flavorings, such as chocolate chips, vanilla, etc. as known in the art.

The cookie dough may be prepared by any of the number of preparation methods known in the art. A preferred method includes combining the sugar, shortening and humectant in a bowl to form a mixture. Eggs are then added to the mixture. In a separate container, a premix of hydrocolloid, salt, leavening agent, added fiber and non-fat dry milk is prepared. The premix is added to the mixture and stirred. Flour and water are then added to the stirred mixture and any flavorings are added. Stirring is then completed.

Browning agents used in the composition include cocoa powder, dark sugar, molasses, syrup, caramel coloring, chocolate chips, coffee, natural pigments and emulsions such as those described in Fellenz, D. C. et al., *Food Technology*, page 111 (June, 1991). Preferred browning agents include cocoa powder, dark sugar and chocolate chips. The browning agent in the cookie composition compliments the browning of the dough surface using a susceptor according to the invention.

In a preferred embodiment, whole wheat flour is used rather than white flour to incorporate fiber in the dough. In the novel cookie composition added fiber is also a part of the composition. Added fiber is defined as fiber added in an isolated form in excess of fiber brought into the cookie dough by the whole wheat flour and is in a range of about 2 to about 15% of the cookie's composition. Examples of fibers within the scope of the invention include pea, oat, sugar beet, soya fiber, or any other fiber known in the art. The preferred fiber for the cookie dough is pea.

Humectants of the cookie dough are selected to provide the correct balance of moisture in the dough upon baking in the microwave. Humectants used within the invention include fructose, corn syrup, high fructose corn syrup, glycerol and polydextrose. Certain shortenings may also contribute to a moisture balance of the baked cookie.

In a preferred embodiment, shortening in a solid or semisolid form is used. Additionally, emulsifiers added to the shortening improve the spreadability qualities of the cookie. Such emulsifiers include, propylene glycol mono- and di-esters, diacetyl tartaric acid, and esters of mono- and di-glycerides. A commercially available example of a propylene glycol mono ester within the scope of the invention is Durpro ® owned by Van den Bergh Foods Company of Lisle, Ill. Panodan 15 ® is an example of a diacetyl tartaric acid mono- and diesters useful within the scope of the invention and owned by Grinsted Products, Inc. of Industrial Airport Park, Kans.

The leavening agents used in the preferred dough embodiments are chemical and include sodium bicarbonate and sodium aluminum phosphate, as well as any other conventionally known chemical leavening ingredients. Preferred hydrocolloids used within the invention include xanthan, locust bean gum, guar, sodium carboxymethyl cellulose, carragenan, or mixtures thereof. The preferred hydrocolloid is a mixture of xanthan, locust bean gum and guar known as Kelco GFS ® owned by Kelco, Inc. of San Diego, Calif.

As is known in the art, whole eggs have hydrocolloid properties.

Additionally, the water may be added to the dough.

The cookie dough is preferably prepared and packaged so that a consumer may obtain a single 40± gm size serving of dough to be placed on the inventive susceptor for baking. Such forms may be tub shaped with a scoop provided or in a cylindrical shape with pre-cut cookie servings.

Other expandable doughs which may be cooked in the invention to provide crispy browned surfaces include cake, bread, biscuit, croissant, etc. These doughs should be chemically leavened or preproofed prior to microwave cooking.

The following examples illustrate the invention more fully. It is understood that this invention is not limited to the examples provided.

Example 1

A conventional cookie dough recipe, consisting of whole wheat flour, sugar, margarine, water and baking soda of the following formula was prepared.

TABLE 1

| Ingredients | Percentage of Composition |
|---|---|
| Sugar | 24.58 |
| Margarine | 27.30 |
| Whole Wheat Flour | 46.42 |
| Baking Powder | 0.33 |
| Water | 1.37 |

The sugar, margarine and baking soda were combined in a bowl and mixed for 2-3 minutes. The flour and water were then added and stirred for 3-4 more minutes.

Conventional baking of the cookie dough was done at 375° F. for 15 minutes in a conventional oven by placing a scoop of dough of a size of about 40 gms. on an aluminum baking sheet.

In comparison, a similar sized scoop was placed on a microwavable dish and microwaved in a GE ® Jet 342-001 microwave oven for 25 seconds.

Cookies baked from the foregoing formula in the conventional oven had good organoleptic qualities, were moist and uniformly brown. However, the same cookie dough when baked in the microwave oven resulted in cookies which were hard in texture and lacked the characteristic browning or crisping of baked cookies. Cooking times were adjusted in the microwave oven up to two minutes. However, charring areas and undercooked spots resulted in the microwaved cookies and the desirable brown color of baked cookies was not achieved.

It is noted that the cookies were microwaved on a standard dish rather than a susceptor.

Example 2

Cookie dough of the following formula was prepared.

TABLE 2

| Ingredients | Percentage of Composition |
|---|---|
| Whole Wheat Flour | 29.86 |
| Soda | 0.44 |
| Salt | 0.36 |
| Margarine | 21.01 |
| White Sugar | 14.60 |
| Brown Sugar | 14.93 |
| Chocolate Chips | 18.80 |

The cookie dough was prepared as discussed in Example 1 with the chocolate chips added last to the mixture and mixed for 2-3 minutes.

The cookie dough was baked on three types of commercially available susceptors obtained from Waldorf, Corp. of Chicago, Ill. The metal film layer of the 3 susceptors was composed of 17.5 point SUS/metal PET. The three susceptors differed in the support means, namely, one included a flute corrugated lamination applied to,the film layer, a second susceptor contained metalized PET on the fluted side and a third type of susceptor contained holes in the laminated material.

Cookies were baked on the three types of susceptors for about 1 minute each. It was observed that cookies baked on any of the three susceptors were hard, dry and charred in various places.

Example 3

A cookie dough of the following formula was prepared.

TABLE 3

| Ingredient | Percentage of Composition |
|---|---|
| All Purpose Flour | 24.70 |
| Dark Brown Sugar | 7.50 |
| White Sugar | 12.50 |
| High Fructose Corn Syrup | 6.90 |
| Shortening with Emulsifiers[1] | 16.00 |
| Whole Eggs | 5.00 |
| Baking Soda | 0.25 |
| Salt | 0.25 |
| Non-fat dry milk | 2.10 |
| Kelco ® Gum[2] | 0.30 |
| Flavor | 0.40 |
| Chocolate Chip | 19.60 |
| Water | 4.50 |
| Cocoa Powder | 0.01 |

[1]Shedd's Wonder Shortening of Van den Bergh Foods Co., Lisle, Ill. including mono- and di-glyceride, 1.8%, salt, 1.5% and milk solids, 0.8%.
[2]Kelco ® GFS owned by Kelco Inc. of San Diego, Ca.

The cookie dough was prepared by mixing the white sugar, shortening and high fructose corn syrup in a bowl for 3 to 5 minutes to form a mixture. The eggs were then added to the mixture. In a separate container, a premix of the gum, salt, baking soda non-fat dry milk, flavor and cocoa powder was prepared. The premixture was added to the mixture and stirred for 3 to 5 minutes. The flour and water were then added to the bowl and mixed for an additional 3 to 5 minutes. Chocolates chips were added last and mixed for an additional 1 to 2 minutes.

A scoop of about 40 gms of the dough was placed on a susceptor according to the invention and baked in a GE ® Jet 342-001 microwave oven for 1 minute and 30 seconds. It was observed that the resulting baked cookies had good organoleptic qualities (good taste and mouth feel) but excessive spreading of the cookie dough was observed.

Example 4

The following formula was prepared.

TABLE 4

| Ingredient | Percentage of Composition |
| --- | --- |
| Whole Wheat Flour | 24.30 |
| Dark Brown Sugar | 7.50 |
| White Sugar | 12.00 |
| High Fructose Corn Syrup | 7.00 |
| Shortening with Emulsifiers[1] | 15.00 |
| Whole Eggs | 5.00 |
| Baking Soda | 0.25 |
| Salt | 0.25 |
| Non-fat Dry Milk | 2.00 |
| Kelco ® Gum[2] | 0.30 |
| Pea Fiber[3] | 2.50 |
| Flavor | 0.40 |
| Chocolate Chips | 19.00 |
| Water | 4.50 |
| Cocoa Powder | 0.01 |

[1]Shedd's Wonder Shortening of Van den Bergh Foods, Lisle, Ill.
[2]Kelco GFS ® owned by Kelco, Inc. of San Diego, Ca.
[3]Grinsted Pea Fiber, 150 Powder, owned by Grinsted Products, Inc. of Industrial Airport Park, Kansas The foregoing cookie dough was prepared as described in Example 3 except the pea fiber was added to the premix.

The cookie dough was divided into 40 gm scoops and baked on a susceptor according to the invention for one minute and 30 seconds in a GE ® Jet 342-001 microwave oven as described in Example 3. Good organoleptic properties, uniform browning and crisping and consumer acceptable moist cookies were obtained.

Example 5

A cookie dough similar to the dough of Example 4 was prepared for a sugar cookie as follows:

TABLE 5

| Ingredient | Percentage of Composition |
| --- | --- |
| Whole Wheat Flour | 30.75 |
| White Sugar | 24.70 |
| High Fructose Corn Syrup | 8.90 |
| Shortening with Emulsifiers[1] | 19.00 |
| Whole Eggs | 6.33 |
| Baking Soda | 0.32 |
| Salt | 0.32 |
| Non-fat Dry Milk | 2.50 |
| Kelco ® Gum[2] | 0.38 |
| Pea Fiber[3] | 3.15 |
| Flavor | 0.50 |
| Water | 3.15 |

[1]Shedd's Wonder Shortening of Van den Bergh Foods, Lisle, Ill.
[2]Kelco GFS ® owned by Kelco, Inc. of San Diego, Ca.
[3]Grinsted Pea Fiber, 150 Powder, owned by Grinsted Products, Inc. of Industrial Airport Park, Kansas A cookie dough was prepared as described in Example 3 without the additions of dark brown sugar, chocolate chips and cocoa powder. The cookies were baked in a microwave oven on a susceptor according to the invention for one minute and 20 seconds to obtain moist uniformly brown cookies of desirable organoleptic properties.

Example 6

Cookie dough described in Example 4 was prepared and baked in a microwave oven on four types of susceptors as illustrated in FIGS. 6–9. In particular a scoop of about 40±2 gms. of the dough was placed on the patterned portion of each of the four susceptors and baked in a GE ® Jet 342-001 microwave oven for 1 minute 30 seconds on a high temperature setting.

Figure 6:
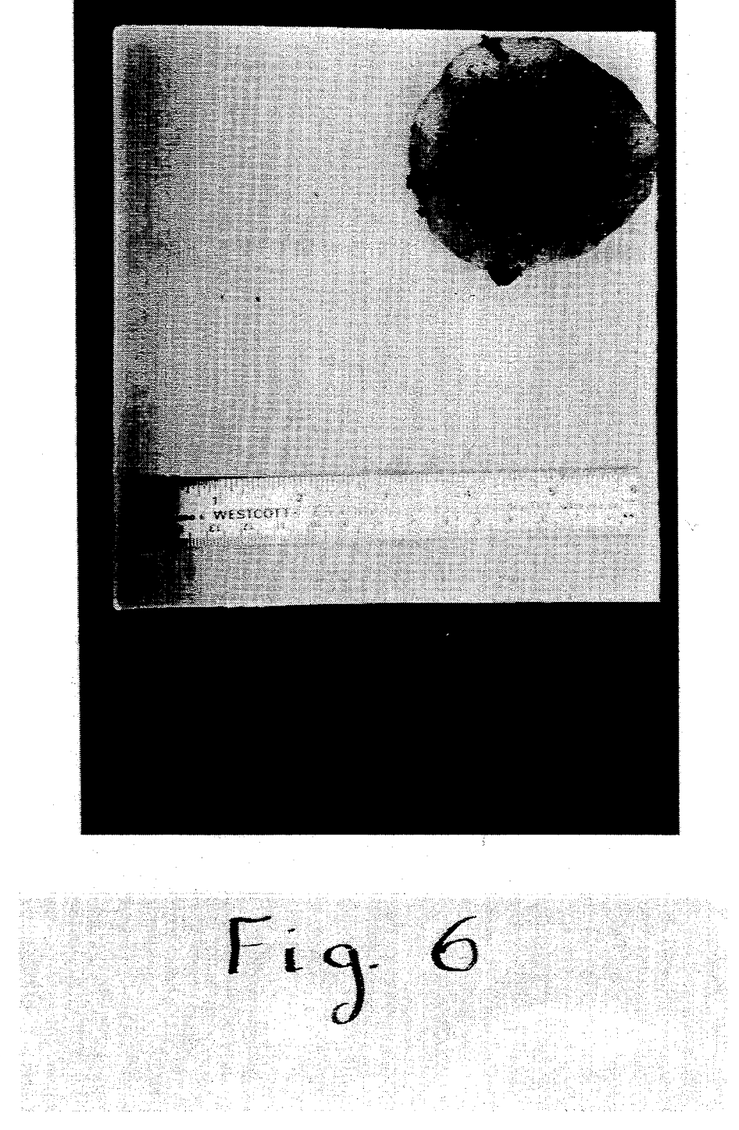
FIG. 6 is a photograph of a bottom surface of a microwaved cookie and a susceptor having a uniformly metalized film, according to the prior art, upon which the cookie was baked.
Figure 7:
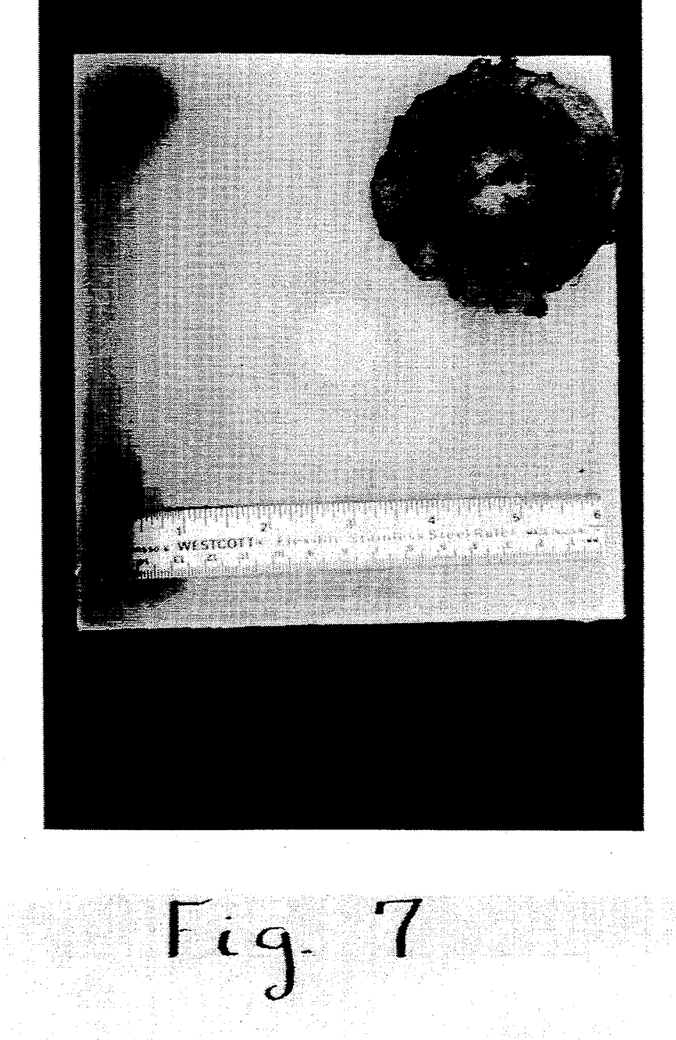
FIG. 7 is a photograph of a bottom surface of a microwaved cookie and a prior art susceptor upon which it was baked which has a relatively large non-metalized center portion.

FIG. 6 shows a cookie baked on a substantially uniform susceptor as known in the prior art. The cookie was overly browned to charred on substantially all of its surface in contact with the susceptor. In FIG. 7, a susceptor having a non-metalized portion with a radius of 5 centimeters encompassed by a metalized portion as photographed was used to bake cookie dough as described in Example 4. As illustrated, the microwaved baked cookie was underdone in the area corresponding to the non-metalized portion and burnt in the area corresponding to the metalized portion.

Figure 8:
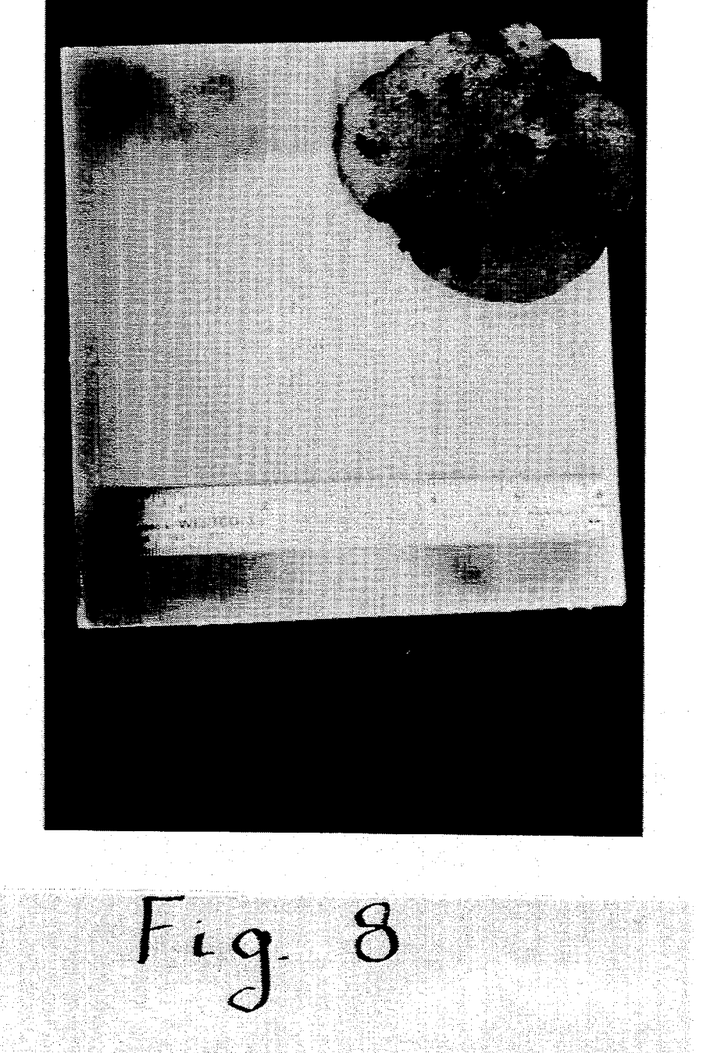
FIG. 8 is a photograph of a bottom surface of microwaved cookie and a prior art susceptor having a relatively smaller non-metalized center portion, in comparison to the susceptor of FIG. 10, upon which the cookie was baked.

In FIG. 8, a photograph showing a susceptor having a pattern similar to the pattern of the susceptor of FIG. 7 was used to microwave cookie dough as described in Example 4. The non-metalized center portion of the susceptor had a radius of 2 cm. Undercooking and overcooking corresponding to the non-metalized and metalized portion, respectively, was again observed.

Figure 9:
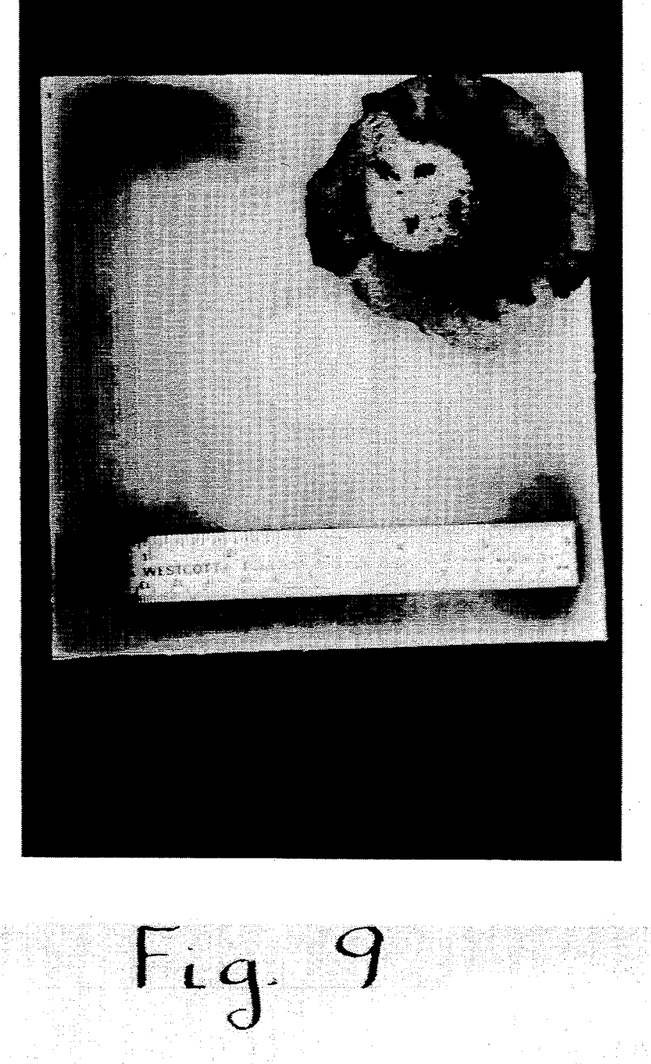
FIG. 9 is a photograph of a bottom surface of a microwaved cookie and a susceptor tray according to the invention upon which the cookie was baked.

In FIG. 9, cookie dough according to example 4 was microwaved on a patterned susceptor according to the invention as photographed. Even browning across the surface of the cookie was observed and a cookie with good organoleptic properties was produced.

Example 7

The following chemically leavened croissant dough was prepared:

TABLE 6

| Ingredient | Percentage of Composition |
| --- | --- |
| Bread Flour | 50 |
| Vital Wheat Gluten | 1.5 |
| Sugar | 7 |
| Salt | 1 |
| Non-fat Dry Milk | 2.5 |
| Panodan 205K Emulsifier[1] | 0.5 |
| Durem 204 Emulsifier[2] | 1.0 |
| All Purpose Shortening[3] | 1.0 |
| Baking Soda (Sodium Bicarbonate)[4] | 1.0 |
| Baking Powder (Sodium Bicarbonate & Sodium Acid Pyrophosphate)[5] | 2.5 |
| Water | 32.0 |
| | 100.00 |
| Roll-in-Fat or Laminating Fat[6] | 30% of dough composition |

[1]Datem (diacetyl tartaric esters of mono- and diglycerides) supplied by Grinstead Company of Industrial Airport Park, Ks.
[2]52% monoglycerides/48% diglycerides supplied by Van den Bergh Foods of Lisle, Ill.
[3]Creamtex ® shortening supplied by Van den Bergh Foods, Lisle, Ill.
[4]Supplied by Monsanto of St. Louis, Mo.
[5]Supplied by Monsanto of St. Louis, Mo.
[6]Supplied by Monarch Fine Foods of Ontario, Canada under the trademark Golden Margarine.

The croissant dough was preparing by mixing the flour, gluten, sugar, salt, nonfat dry milk, Panodan 205K ® emulsifier, baking soda and baking powder together to forma mixture. The Durem 204 ® emulsifier and the shortening were then added to the mixture. The water was then added and the resulting mixture was put into a Hobart ® dough mixer supplied by Hobart Corp. of Troy, Ohio, for 6 minutes to form the dough. The dough was refrigerated for 30 minutes. After refrigeration the dough was shaped into a rectangle and the roll-in fat was spread onto one-half of the rectangular-shaped dough surface. The dough was folded to form a square so that the fat spread surface of the dough met the dough surface having no fat to form a sandwich of dough-fat-dough. The sandwiched dough was then passed through a Rhondo ® laminator supplied by Feewer Rhondo of Woodridge, N.J. to flatten the dough. The flattened dough was folded to form a C-fold dough to obtain 6 layers of alternating dough and fat. The C-fold dough was refrigerated for 30 minutes. The refrigerated dough was book-folded to form 24 layers of alternating fat and dough. The book folded dough was spread then cut into triangles having a base of 10 centimeters and a height of 20 centimeters. Each triangle was shaped into croissant shaped dough.

Each croissant dough is baked 2 minutes in a GE ® jet 342-001 microwave oven on the inventive susceptor.

To achieve overall browning the croissant dough was placed on the surface of one of the inventive suspectors and a second suspector was placed on top of the dough. Two accordion shaped paper flutes separated on the two susceptors on two sides.

A baked croissant having overall traditional croissant shape with crisp layers.

We claim:

1. A microwave product for cooking an expandable dough by microwave radiation comprising:
    (a) a susceptor means having a first surface, a second surface and a film layer of metal deposited on said first surface, the film layer having an inner region and an outer region and the susceptor means is used to absorb a portion of a microwave field energy and convert said portion to thermal heat, the inner region of the film layer being substantially encompassed by the outer region and having an intensity of the deposited metal in a range of from about 25% to about 75%, relative to an intensity of about 100% of the outer region, the intensity of the inner region increasing in a continuous manner from a center point of the inner region to a circumference point of the inner region;
    (b) an expandable dough having a surface area in contact with a surface area of the inner region, the dough increasing nonlinearly as cooking time increases so that a portion of the expandable dough surface area is continuously exposed to a portion of the inner region surface area while another portion of the expandable dough surface area is exposed to a different surface area portion of the film layer; and
    (c) support means adjacent to the second surface of the susceptor means for stabilizing the susceptor means and supporting the expandable dough, the product cooking the expandable dough by the thermal heat without charring or undercooking.

2. The product according to claim 1 wherein the inner region of the film layer has a radius in the range of about 0.7 to about 5 cm from the center point to the circumference point of the inner region.

3. The product according to claim 1 wherein the inner region has a plurality of metalized and non-metalized sectors, each sector being substantially radially symmetrical to another sector and arranged so that a metalized sector is adjacent to a non-metalized sector in the inner region.

4. The product according to claim 3 wherein the total number of metalized and non-metalized sectors is in a range of from about 8 to about 6.0.

5. The product according to claim 4 wherein the ratio of metalized sectors to non-metalized sectors is from 0.25 to 3.

6. The product according to claim 1 wherein the inner region of the film layer comprises a plurality of concentric areas, each concentric area substantially encompassing another of the concentric area, in a direction from the center point to the circumference point of the inner region.

7. The product according to claim 1 wherein the intensity of the inner region continuously increases from the center point to the circumference point in a substantially linear manner.

8. The product according to claim 1 wherein the intensity of the inner region continuously increases from the center point to the circumference point in a substantially non-linear manner.

9. The product according to claim 1 wherein the intensity of the inner region is about 50% intensity relative to the intensity of the outer region.

10. The product according to claim 1 wherein the dough is cookie dough.

11. The product according to claim 10 wherein the cookie dough comprises a humectant and a hydrocolloid.

12. The product according to claim 1 wherein the cookie dough further comprises a browning agent selected from the group consisting of dark brown sugar or cocoa powder.

13. The product according to claim 1 wherein the humectant is selected from the group consisting of high fructose corn syrup, glycerol and polydextrose.

14. The product according to claim 11 wherein the cookie dough further comprises added fiber selected from the group of pea fiber, oat fiber, sugar beet fiber and soya fiber.

15. The product according to claim 11 wherein the hydrocolloid is a gum selected from the group consisting of xanthan, locust bean gum, guar, carageenan and mixtures thereof.

16. The product according to claim 1 further comprising baking sheet means positioned between the first surface of the susceptor means and the dough and used for minimizing damage to the susceptor means to provide multiple uses of the susceptor means.

17. The product according to claim 16 wherein the baking sheet means is made of woven glass fibers coated with a tetrafluoroethylene polymer.

18. The product according to claim 1 wherein the support means is formed in a shape of a closure means for closing the product.

19. A method for using a microwavable product comprising:
    (a) selecting a susceptor means having a first surface, a second surface and a film layer of metal deposited on said first surface, the film layer having an inner region and an outer region and the susceptor means is used to absorb a portion of a microwave field energy and convert said portion to thermal heat the inner region of the film layer being substantially encompassed by the outer region and having an intensity of the deposited metal in a range of from about 25% to about 75%, relative to an intensity of about 100% of the outer region, the intensity of the inner region increasing in a continuous manner from a center point of the inner region to a circumference point of the inner region;

(b) placing a cookie dough on substantially an entire surface of the inner region of the film layer; and (c) baking the cookie dough in a microwave oven for a sufficient time to brown a surface of the cookie dough in contact with the inner region of the film layer.

20. The method according to claim 19 wherein the baking step (c) is less than about 2 minutes.

21. The method according to claim 19 wherein the selecting step (a) comprises selecting an inner region of the susceptor means having a plurality of metalized and non-metalized sectors, each sector being substantially radially symmetrical to another sector and arranged so that a metalized sector is adjacent to a non-metalized sector.

* * * * *